Jan. 31, 1967   H. L. LUSSIER   3,300,980
AFTERBURNER IGNITER IN GAS TURBINE ENGINE
Filed April 30, 1965   3 Sheets-Sheet 1
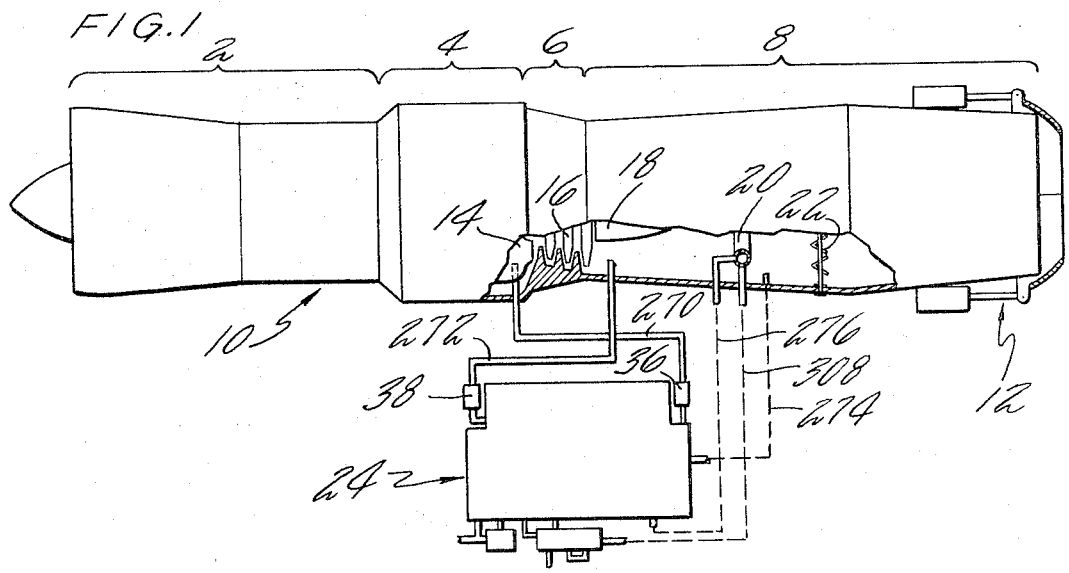
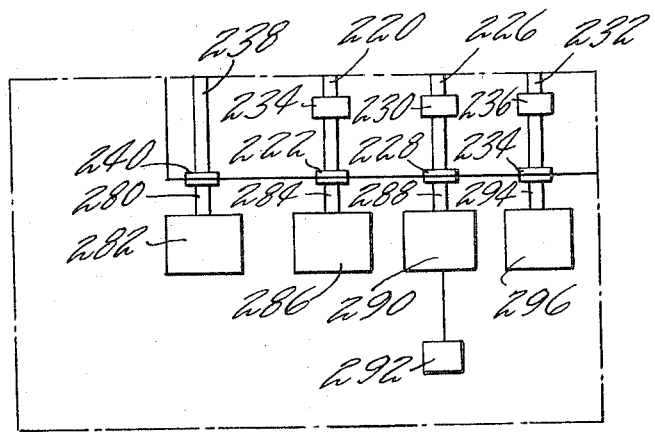
INVENTOR
HENRY L. LUSSIER
BY Jack N. M. Carthy
AGENT

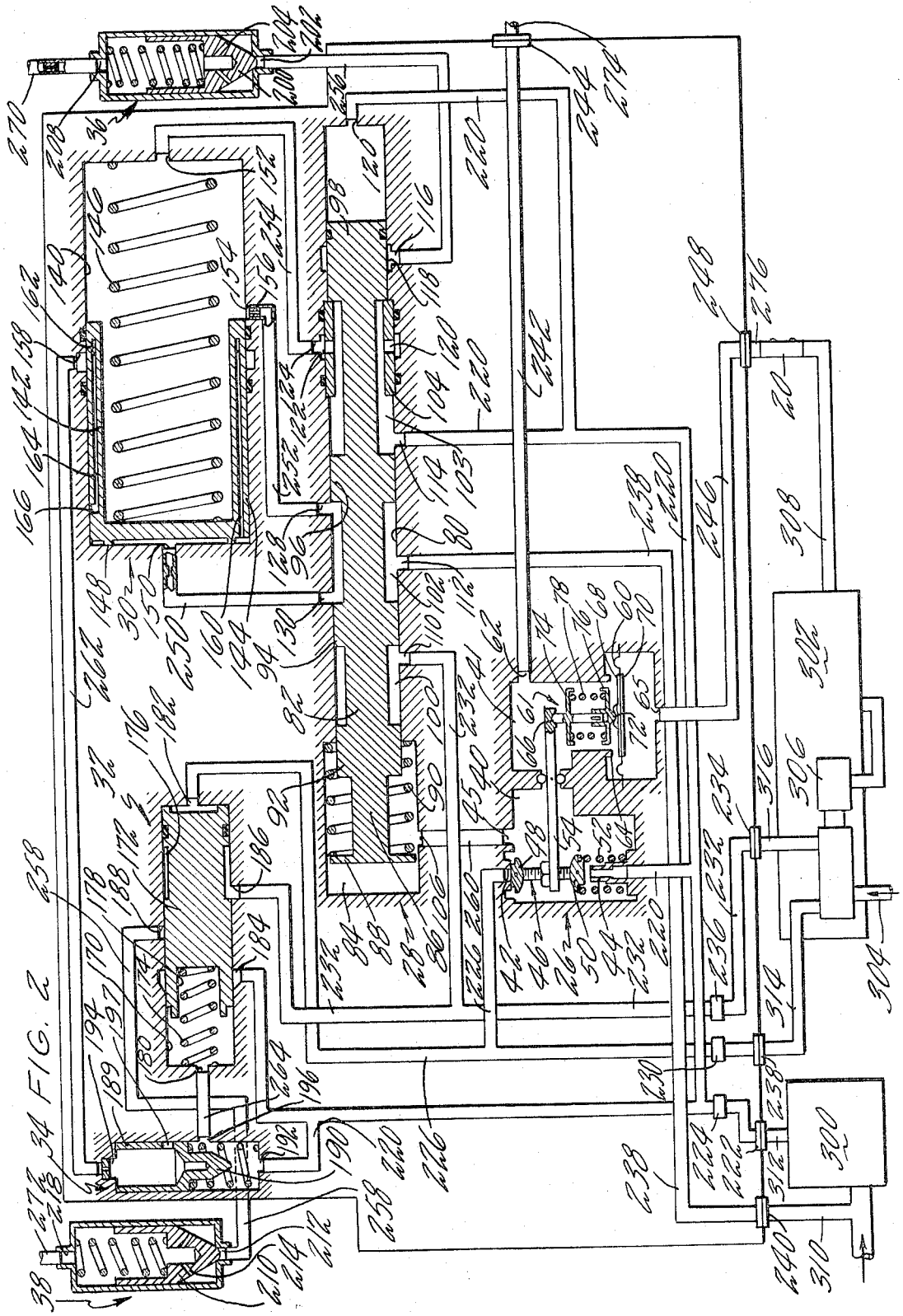

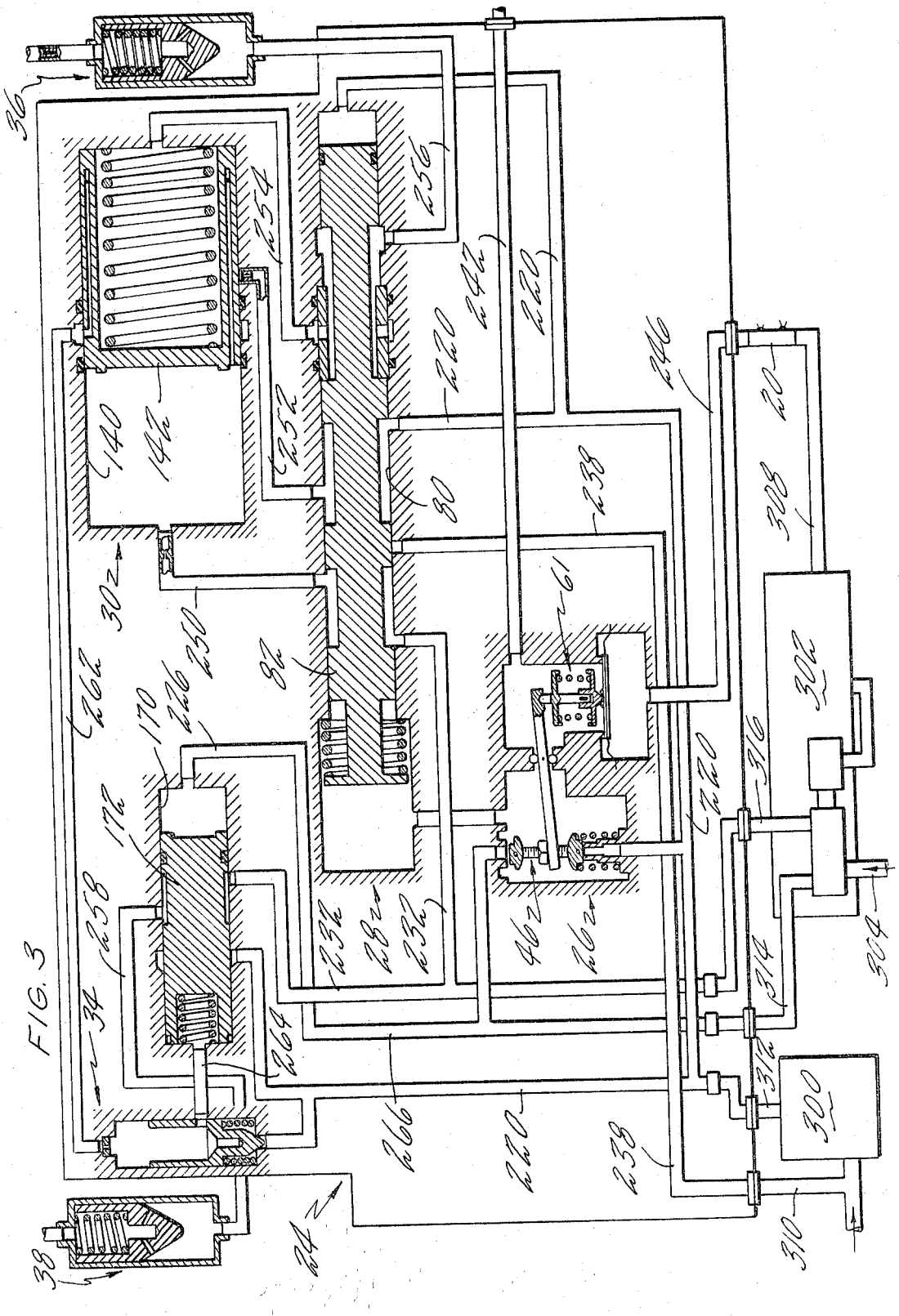

United States Patent Office 3,300,980
Patented Jan. 31, 1967

3,300,980
AFTERBURNER IGNITER IN GAS
TURBINE ENGINE
Henry L. Lussier, East Hartford, Conn., assignor to United Aircraft Corporation, East Hartford, Conn., a corporation of Delaware
Filed Apr. 30, 1965, Ser. No. 452,219
13 Claims. (Cl. 60—241)

This invention relates to an igniting device which extends a flame from a source by injecting amounts of fuel along a spaced duct in properly spaced and timed relation. This device has particular use in the ignition of an afterburner of a jet engine.

One object of this afterburner igniter control is to provide means for injecting fuel between a flame source and a downstream point to be ignited and then injecting a predetermined amount of fuel into the flame so that it extends to the amount being injected which will then ignite and carry the flame further to the point desired.

Another object of this invention is to provide an afterburner igniter control which is actuated by all fuel pressures and does not use air for actuation.

A further object of this invention is to provide an afterburner igniter in which parts thereof subjected to excessive heat are cooled by a constant control flow of fuel.

Another object of this invention is to provide an igniter which will discharge a flow of fuel at a regulated flow rate through an orifice into an afterburner duct and discharge a measured slug of fuel into one of the combustion chambers of the main engine.

A further object of this invention is to provide an afterburner igniter which will be rearmed when the pilot places the control lever in a position calling for non-afterburning.

Another object of this invention is to provide for an immediate flow of ignition fuel into the afterburner at a point downstream of the engine turbine when afterburning is called for with a delayed slug of ignition fuel being injected into a burner in the main engine upstream of the engine turbine when a signal is received indicating that fuel is being injected into the afterburner downstream of the point of injection of the slug of ignition fuel through an injection device such as a spray ring.

A further object of this invention is to provide an afterburner igniter having a main injector device and an auxiliary injector device wherein restricting means are provided to control the rate at which a slug of igniting fuel is injected by the main injector device and restricting means are provided controlling the rate at which the auxiliary injector device is shut off.

Other objects and advantages will be apparent from the specification and claims and from the accompanying drawings which illustrate an embodiment of the invention.

FIGURE 1 is a side view of an aircraft turbojet engine with an afterburner partially in section showing the relation of the afterburner igniter control.

FIGURE 2 is a schematic view of the afterburner igniter control with its parts in the non-afterburning position.

FIGURE 3 is a schematic view of the afterburner igniter with its parts in the position called for upon ignition of the afterburner.

FIGURE 4 is a view showing an independent arrangement for sources of actuating fluid for the afterburner igniter control.

Referring to FIG. 1 the turbojet engine 10 shown comprises basically a compressor section 2, a burner section 4, a turbine section 6, and an afterburner unit 8. A variable nozzle unit 12 is shown attached to the rear end of the afterburner. A typical engine arrangement such as this is shown in U.S. Patent No. 2,865,167. In the broken away portion of FIG. 1 a burner can 14 can be seen discharging into the turbine blades 16 with the flow from the turbine blades then passing around a tail cone 18 into the afterburner. In the afterburner 8 itself a spray ring 20 is mounted along with flameholders 22.

The afterburner igniter control 24 is comprised of seven main parts. These parts consists of: (1) A pressurizing valve 26, (2) an arming valve 28, (3) a main injector device 30, (4) an auxiliary injector device 32, (5) a control valve 34, (6) a main injector valve 36, and (7) an auxiliary injector valve 38.

The pressurizing valve 26 consists of a housing having two chambers 40 and 41 therein. Chamber 40 has two inlets 42 and 44 axially aligned with each other so that a valve device 46 can be moved therebetween and one outlet 45. Valve device 46 comprises a stem having a valve closure member 48 mounted on one end for engagement with opening 42 and a valve closure member 50 on the other end for engagement with opening 44. The stem is of such a length so that when valve closure member 48 contacts 42 opening 44 is connected to chamber 40 and when valve closure member 50 contacts opening 44, opening 42 is connected to chamber 40. A spring member 52 is positioned between the housing of pressurizing valve 26 and the bottom of valve closure member 50 so that the valve device 46 is biased to a position which closes opening 42 and opens opening 44. An actuating rod 54 extends through an opening between chambers 40 and 41 to actuate the valve member 46. This rod is pivoted to the housing of the pressurizing valve between the two chambers and is sealed to prevent flow therebetween. The free end of the rod 54 extending into chamber 40 is fixed to the valve member by any operable means desired. To allow for the arcuate movement of the end of the rod, the valve closure members 48 and 50 can be pivoted to the stem to permit proper seating alignment.

Valve chamber 41 which provides the actuating force for the rod 54 is divided into two parts by a diaphragm 60. The diaphragm 60 is connected to the free end of the actuating rod 54 by connecting means 61 so that movement of the diaphragm properly conveys its movement to the rod. The portion of chamber 41 containing the end of rod 54 has an opening 62 therein and the other portion of the chamber 41 on the other side of diaphragm 60 has an opening 65 therein.

The connecting means 61 could consist merely of a rod between the center of the diaphragm 60 and a pivotal mounting to the end of the free rod 54 if the rod 54 were made of a material strong enough to withstand the high pressure which can be achieved in the portion of chamber 41 below the diaphragm. It can be seen that to insure seating of valve closure member 50 on opening 44 it is necessary that the closure member is seated before the diaphragm is stopped by the stopping means 64. This means that bending will be placed in the rod 54.

However, to prevent any stress on the rod 54 the connecting means 61 is shown. This connecting means 61 comprises an expansible spring link positioned between the actuating end of rod 54 in chamber 41 and the center of the diaphragm 60. As seen in FIG. 2 in the non-afterburning position, the free end of the rod 54 has means thereon with a socket 66. The center of the diaphragm has two metal disks 68 and 70 fixed to the center thereof. The center of the disk 68 includes a socket 72 similar to socket 66. The disk 68 is made of such a size so that it will contact the stop means 64 on the pressurizing valve housing. The expansible spring link comprises two spring seats 74 and 76 which are axially aligned and permitted axial movement by a cooperating sleeve and rod fixed respectively to the two spring seats. A spring 78 is positioned between the seats. The spring seat 74 has a ball type projection which engages socket 66 and the spring seat 76 has a ball type projection which engages socket 72. Means are provided between the cooperating sleeve and rod of the spring seats to limit the extended length. This can be a fixed pin and elongated slot arrangement in the respective parts.

In this arrangement as the valve device 46 is actuated by diaphragm 60 to seat valve closure member 50 on opening 44, when the closure member 50 seats before the diaphragm is stopped by the stopping means 64, further movement of diaphragm 60 merely compresses the spring 78 until the metal disk 68 contacts the stop means 64.

The arming valve 28 consists of a housing having a bore 80 which receives a valve member 82. The valve member 82 is slideably mounted for limited movement in the bore 80. Bore 80 has an enlarged chamber or bore 84 located at one end and the valve member 82 at that end has a stem 86 projecting thereinto with an enlarged valve seat member 88 thereon. A spring 90 is positioned between the valve seat 88 and the part of the housing where bore 80 enters into the enlarged chamber or bore 84. This spring 90 biases the valve member 82 towards the left as shown in FIG. 2 against a stop to be hereinafter described.

The valve member 82 has three annular projections 92, 94, 96 and end piston 98 thereon forming three annular grooves therebetween, 100, 102 and 103, respectively. The movement of valve member 82 is limited by a stop and seal member 104 located in a groove formed in the bore 80 and which projects as an annular projection into the bore. This annular stop and seal member 104 projects into the bore so as to extend into annular groove 103. The movement of the valve member 82 is permitted movement to the left as shown in FIG. 2 until piston 98 strikes the end of the stop and seal member 104 and the movement of the valve member 82 is permitted movement to the right as shown in FIG. 3 until projection 96 strikes the end of the stop and seal member 104. The ends of the member 104 are formed of a material so as to form a seal when contacted by the mating part of the valve member 82.

Chamber or bore 84 is formed having an opening 106 therein. The housing of the arming valve 28 has other openings extending therethrough to the bore 80 so that they have predetermined positions with respect to the valve member 96 in each of the positions as shown in FIG. 2 and FIG. 3.

As shown in FIG. 2 the housing has an opening 110 which enters the bore connecting with the annular groove 100 just to the left of the land 94. An opening 112 through the housing extends into the bore where it contacts the annular groove 102 approximately at its center. An opening 114 extends through the housing and is connected to the annular groove 103 just to the right of the projection 96. Another opening 116 extends through the housing to an annular groove 118 in the surface of bore 80 which extends around the surface of piston 98. Another opening 120 extends through the end of the housing to the area between the end of the bore and the end of the piston 98. A small annular groove 122 extends around the surface of the groove in the bore containing the stop and seal member 104. Opening 124 extends through the housing to said annular groove 122 and openings 126 in the stop and seal member 104 connect the annular groove 122 to the annular groove 103. Opening 128 extends through the housing to the annular groove 102 adjacent annular projection 96 and an opening 130 extends through the housing into the annular groove 102 adjacent annular projection 94.

As shown in FIG. 3 opening 110 is still connected with the annular groove 100 but is located just to the right of the land 92. Opening 112 is now covered by land 94. Opening 114 is connected to the annular groove 102 just to the left of the projection 96. Annualr groove 118 is connected to annular groove 103 to the left of piston 98. Since the openings 126 are in the stop and seal member 104 they still connect the annular groove 122 to the annular groove 103. Opening 128 is still connected to the annular groove 102 but is now located nearer the projection 94. Opening 130 now extends into annular groove 100 just to the left of projection 94.

The main injector device 30 consists of a housing having a cylindrical bore 140 containing a piston member 142 mounted for reciprocation therein. The piston 142 has a large cylindrical counter bore 144. A spring 146 extends into the counter bore 144 with one end against the piston 142 and the other end against the housing at the end of the cylindrical bore 140. This keeps the piston 142 biased to the left as shown in FIG. 2. Projections 148 extend from the end of the piston 142 opposite from the counter bore 144. An opening 150 extends through the housing to the area formed between the piston and the end of the cylindrical bore 140 formed by projections 148. An opening 152 extends through the housing into the opposite end of the cylindrical bore 140. As shown in FIG. 2 an opening 154 extends through the housing into the cylindrical bore 140 just to the right of the end of the piston 142. A restriction 156 is placed in opening 154. This restriction controls a cooling flow in non-afterburning position of piston 142. An annular groove 158 extends around the cylindrical bore 140 and opens upon the outer end surface of the end of piston 142 adjacent its end. An opening extends through said housing to the annular groove 158. Seal members are located on both sides of said annular groove 158 contacting the piston 142. Piston 142 is formed having three passages 160 extending from the end of the piston having the projections 148 to a point adjacent the other end. These passages 160 are equally spaced around the piston. The outer ends of the passages 160 are connected by an annular passage 162. Three other passages 164, equally spaced and one between each pair of passages 160, extend from the annular passage 162 to openings 166 located in the side surface of the piston. These openings 166 are blocked by the surface of the bore 140.

As seen in FIG. 3 the piston member 142 is located at the right end of the cylindrical bore with opening 154 covered by the side of the piston 142 and with openings 166 engaging the annular groove 158.

The auxiliary injector device 32 is formed comprising a housing with a cylindrical bore 170 containing a piston 172 mounted therein for reciprocal movement. A spring 174 located between the piston 172 and the end of cylindrical bore 170 biases the piston to the right as shown in FIG. 2. The piston 172 is formed having an annular groove 176 around its periphery and a counter bore 178 in one end to receive the spring 174. The other end of the piston has projections to space it from the end of the bore. An opening 180 extends through the housing in one end to be connected with the interior of the cylindrical bore 170 and a second opening 182 extends through the housing to contact the other end of the cylindrical bore 170 and cooperating end of piston 172. An annular groove 184 is formed in the surface of the cylindrical bore 170 and is positioned to be just to the right of the end of the piston a predetermined distance when in the position shown in FIG. 2. As seen in FIG. 2, an opening 186 extends through the housing and is connected to the annular groove 176 at its left end. An opening 188 extends through the housing and is closed by the portion of piston 172 to the left of the annular groove 176. As seen in FIG. 3 the piston 172 is positioned to the left of the cylindrical bore 170 and the opening 186 is connected to the annular groove 176 at its right end and opening 188 is now connected to the annular groove 176 at its left end, being uncovered by the portion of the piston contacting the cylindrical bore 170.

Control valve 34 consists of a housing having a cylindrical bore therein with a piston member 189 containing a valve member 190 of smaller diameter at one end adapted to engage an opening 192 in the housing at the end of the cylindrical bore. The piston is biased to an upper position as shown in FIG. 2. An opening 194 extends through the housing and is connected to the rear of the piston member. A restriction is located in said opening. It is noted that this restriction can be of a variable type or changed to different sizes to time the movement of the piston 210. This will time the closing of piston 172 and provide coordination between the termination of the injection of the slug of igniting fuel into the burner can 14 and the termination of the flow of igniting fuel into the afterburner. An opening 196 extends through said housing and is connected to the interior of the cylindrical bore in the housing below the piston 189 when positioned as in FIG. 2 and, therefore, in turn to the opening 192. Piston 189 is counter bored from the rear to a point adjacent the valve member 190. An opening 197 extends through the counter bore wall to the exterior surface of the piston at a point where it will align with opening 196 when valve member 190 engages opening 192. As shown in FIG. 3 the piston has been moved by pressure to a downward closed position wherein the valve member 190 engages the opening 192 and opening 197 is aligned with opening 196.

The main injector valve 36 and the auxiliary injector valve 38 are constructed in a similar manner. The main injector valve 36 comprises a housing with a bore having a piston member 200 reciprocal therein. Piston member 200 is formed at one end as a valve member and is adapted to engage an opening 202 in the housing at one end of the bore. As shown in FIG. 2 this piston is biased to a position wherein the valve member engages the opening 202. Passageways 204 connect one end of the piston to the other. The other end of the housing of the main injector valve has an opening 208 for a purpose to be hereinafter described. As shown in FIG. 3 the piston has been moved to its upper position compressing the biasing spring thereby forming an open passageway between opening 202 in one end of the bore and the opening 208 in the other end.

The auxiliary injector valve 38 comprises a housing with a bore having a piston member reciprocal therein. Piston member 210 is formed at one end as a valve member and adapted to engage an opening 212 in the housing at one end of the bore. As shown in FIG. 2 this piston is biased to a position wherein the valve member engages the opening 212. Passageways 214 connect one end of the piston to the other. The other end of the housing of the auxiliary injector valve has an opening 218 for a purpose to be hereinafter described. As shown in FIG. 3 the piston has been moved to its upper position compressing the biasing spring thereby forming an open passageway between opening 212 in one end of the bore and the opening 218 in the other end.

Within the afterburner igniter control 24 the main parts are connected as follows: A passageway 220 interconnects opening 192 of the control valve 34, annular groove 184 of the auxiliary injector device 32, opening 44 of the pressurizing valve 26, and openings 114 and 120 of the arming valve 28 with a connector 222. A filter 224 is placed in the line adjacent connector 222. A passageway 226 interconnects opening 182 of the auxiliary injector device 32 and opening 42 of the pressurizing valve 26 with a connector 228. A filter 230 is placed in the line adjacent connector 228.

A passageway 232 interconnects opening 186 of the auxiliary injector device 32 and opening 110 of the arming valve 28 with a connector 234. A filter 236 is placed in the line adjacent connector 234. A passageway 238 connects opening 112 of the arming valve 28 with a connector 240. A passageway 242 connects opening 62 of the pressurizing valve 26 with a connector 244. A passageway 246 connects opening 64 of the pressurizing valve 26 with a connector 248.

Three passageways interconnect the arming valve 28 with the main injector device 30: (1) a passageway 250 connects the opening 130 with the opening 150, (2) a passageway 252 connects the opening 128 with opening 154, and (3) passageway 254 connects opening 124 with opening 152. It is noted that a restriction is provided in passageway 250 and it can be of a variable type or changed to different sizes to time the movement of the piston 142.

A passageway 256 connects annulus 118 of the arming valve 28 with opening 202 of the main injector valve 36. Passageway 258 connects opening 188 of the auxiliary injector device 32 with opening 212 of the auxiliary injector valve. A short passageway 260 interconnects opening 106 of arming valve 28 with opening 45 of the pressurizing valve 26. A passageway 262 connects opening 194 of the control valve 34 with the annular groove 158 of the main injector device 30, and a passageway 264 connects opening 196 of control valve 34 with opening 180 of the auxiliary injector device 32. A restriction is located in the opening 194.

The external connections of the igniter control comprise connections to the connectors 222, 228, 234, 240, 244 and 248 along with conduits from opening 218 of the auxiliary injector valve 38 and opening 208 of the main injector valve 36. As seen in FIG. 1 a conduit 270 connects the opening 208 of the main injector valve to a point within the burner can 14. A restrictor is placed in this conduit to provide the proper flow and pattern of fuel into the burner. A conduit 272 connects the opening 218 of the auxiliary injector valve 38 to a point within the afterburner just rearwardly of the turbine blades 16.

Connector 244 is connected by a conduit 274 to a point in the afterburner adjacent the spray ring 20. The connector 248 is connected by a conduit 276 to the spray ring 20. It can be seen that in a non-afterburning condition like pressures are transmitted through the conduits 274 and 276 to both sides of the diaphragm 60.

As shown in FIG. 4 connector 240 is connected by a conduit 280 to a low pressure source 282. It is only necessary that this be a low pressure to receive flow from the main injector device 30 during non-afterburning. Connector 222 is connected by a conduit 284 to a pressure source 286 which pressurizes passageway 220 to deliver an actuating pressure thereto. Connector 288 is connected by a conduit 288 to a pressure source 290 which provides a pressure to passageway 226 which is approximately equal to the pressure delivered to conduit 220 during non-afterburning, but when the operating control 292 is actuated by the pilot calling for afterburning, the pressure source is increased and, therefore, the pressure in the passageway 226 which provides a proper actuating pressure to the auxiliary injector device 32 and arming valve 28 when the pressurizing valve 26 has been actuated is increased. Connector 234 is connected by a conduit 294 to a pressure source 296 which will be of such a value to active piston 142 of the main injector device 30, provide flow through the auxiliary injector valve 38, provide flow through control valve 34 to return auxiliary injector valve 172 to the non-afterburning position and provide cooling flow through piston 142 and piston 172.

In FIGS. 2 and 3 the afterburner igniter control 24 is shown connected to an engine fuel pump 300 and afterburner fuel control 302. In designing this control for a specific engine it was found that the engine fuel pump 300 and afterburner fuel control 302 contained existing pressure sources and those sources were used for operation of the afterburner igniter control. The engine fuel pump inlet was found to have an upper pressure limit of approximately 50 p.s.i. and a pump interstage level obtained a value of approximately 25 p.s.i. above that of the pump inlet. The afterburner control 302 which has a fuel supply 304 directed therethrough even during non-afterburning was found to be so regulated that there was a source of pressure therein which was approximately equal to the fuel pump 300 interstage pressure and a second source of pressure was found within the afterburner of approximately 1050 p.s.i. which could be used for the so-called muscle power. The afterburner control was also so devised that when the shut-off valve 306 was opened by the pilot calling for afterburning, not only was fuel directed to the spray ring 20 through conduit 308 but the fuel supply which has been approximately equal to the fuel pump interstage pressure jumped approximately 150 p.s.i.

Therefore, connector 240 was connected to the pump inlet by conduit 310 and connector 222 was connected to the pump interstage pressure by conduit 312, and further, connector 228 was connected to the afterburner fuel control by conduit 314 to the source which was approximately equal to pump interstage pressure at non-afterburning and which jumped approximately 150 p.s.i. when the pilot called for afterburning and connector 234 was connected by conduit 316 to the constant pressure source of 1050 p.s.i.

OPERATION

In a non-igniting or non-afterburning position the control 24 as shown in FIG. 2 has the pressurizing valve 26 positioned with opening 42 closed and opening 44 open since the spring 52 is imparting the only force on the valve device 46. The part of chamber 41 above diaphragm 60 is connected by passageway 242 and conduit 274 to a point in the afterburner adjacent the spray ring 20, therefore, the pressure at this point is conveyed back into the upper part of chamber 41 above the diaphragm 60. The lower part of chamber 41 below the diaphragm 60 is connected by a passageway 246 and conduit 276 to the spray ring 20, and since fuel is not flowing through the spray ring, the same pressure directed by conduit 274 passes through the spray openings into spray ring 20 through conduit 276 and passageway 246 and back into the lower part of chamber 41 below the diaphragm 60. Therefore, the differential pressure across the diaphragm 60 is zero.

The operating pressure in passageway 220 is directed through the control valve 34 into the bore 170 of the auxiliary injector device 32, to act on the left of piston 172. The pressure in conduit 220 is also admitted through opening 44, which is open as set forth above, into chamber 40. This pressure is then directed into chamber 84 of the arming valve 28 by conduit 260. This pressure in conduit 220 is also directed into the right end of bore 80 against the end face of piston 98. It can be seen now that the pressures on either end of the valve member 82 are approximately the same so that the spring 90 will position the valve member 82 to the left with the piston 98 contacting the stop and seal member 104.

With the arming valve 28 positioned as in FIG. 2, the pressure in conduit 220 is also directed therethrough to the right end of bore 140 of the main injector device 30. This fills the main injector device with fluid and in turn communicates with annulus 102 of the arming valve 28 through restriction 156 and passageway 252. Annulus 102 is connected to the left end of bore 140 through passageway 250 and restriction and to connector 240 through passageway 238. This permits the return of piston 142 and cooling flow leakage during periods of non-afterburning.

The pressure in condiut 226 is directed to the opening 42 where it is stopped by the valve device 46 and is directed to the right end of bore 170 against the right end of piston 172.

The pressure in conduit 232 is directed to the annular groove 186 about the piston 172 in bore 170 of the auxiliary injector device 32, this pressure is also admitted to the annular groove 100 in the surface of valve member 82 in bore 80 of the arming valve 28. Under the above conditions the device will remain as shown.

However, when the pilot calls for afterburning, he moves a control which sends a signal to the afterburner fuel control 302 thereby opening valve 306. This action increases the pressure in conduit 314 and therefore passageway 226 approximately 150 p.s.i. and permits fuel to be directed from the afterburner fuel control through conduit 308 to the spray ring 20 where it is sprayed into the gases in the afterburner forming an ignitable mixture.

This increases pressure in passageway 226 moves the piston 172 of the auxiliary injector device 32 to the left, as shown in FIG. 3, against the spring 174 and operating pressure acting on the opposite end of the piston. When the annular groove 176 uncovers opening 188 the fuel in said annulus will flow through passageway 258, open the auxiliary injector valve 38 and flow therethrough to conduit 272 where it will be directed into the afterburner at a point just rearwardly of the turbine blades 16.

While this same increased pressure is directed by passageway 226 to the opening 42, it is not great enough to move the valve device 46 of the pressurizing valve 26.

The fuel pressure which has now been directed to the spray ring 20 is directed into the lower part of chamber 41 below diaphragm 60 causing the diaphragm to move upwardly and actuate the valve device 46 so that opening 44 is closed and opening 42 is open. Now the increased pressure in passageway 226 is permitted to enter chamber 40 and flow through passageway 260 into chamber 84 of the arming valve 28. This pressure overcomes spring 90 and the pressure at the other end of valve member 82 acting on the end face of piston 98 moving the valve member 82 to the right as shown in FIG. 3 with projection 96 against the stop and seal member 104. This action permits annular groove 100 to connect passageway 232 with passageway 250 to the left of the piston member 142 through the restriction. This pressure overcomes the force of spring 146 to force fuel from the bore 140 through passageway 254 into the annular groove 103 and thereby into passageway 256. This fluid opens the main injector valve 36 and permits the measured amount of fuel to pass therethrough into conduit 270 into the burner can 14.

This injection of fuel into the burner can 14 provides a hot streak which carries a flame through the turbine blades 16 and ignites the fuel being injected through conduit 272, ignition of the fuel entering the afterburner through conduit 272 extends the hot streak downstream to ignite the mixture formed by the fuel being injected through the spray ring 20.

As the piston 142 of the main injector device 30 reaches the position shown in FIG. 3, fuel from the left of the piston flows through passages 160, 162 and 164 into passageway 262. This fuel then enters the top of control valve 34 through the restriction biasing the piston 189 downwardly wherein valve member 190 engages opening 192 and opening 197 aligns with opening 196. This fuel then flows through the aligned openings and passageway 264 to act on the left end of piston 172 and move it to the right shutting off fuel flow to conduit 272.

The high pressure now existing in bore 170 to the left of piston 172 is allowed to leak to the annular groove 184 by a controlled fit of the piston and bore at that point. This leakage then is connected to passageway 220 and through connector 222 to the source of operating pressure connected thereto. This leakage flow acts as a coolant while the control is in the afterburning position.

When the pilot is flying using afterburning with the afterburner igniter control in the position as shown in FIG. 3, except for the auxiliary injector device, and he calls for non-afterburning, the valve 306 is closed and the fuel pressure directed to conduit 314 reduces to its non-afterburning level. This subsequent reduction of the pressure in line 226 thereby reduces the pressure in chamber 40, passageway 260 and chamber 84 with the result that the spring 90 moves the valve member 82 to the position shown in FIG. 2. With the valve member 82 of the arming valve 28 back in a non-afterburning position connecting the left of piston 142 to passageway 238, the spring 146 is permitted to return the piston 142 to the position shown in FIG. 2. The right side of the piston 142 and bore 140 is filled with fuel by conduit 254 which has now been reconnected to connector 222. As the spray ring 20 loses pressure from the afterburner fuel control it then conveys the afterburner duct pressure to the portion of chamber 41 below diaphragm 60 of the pressurizing valve 26 and the valve device 46 is then moved by the spring 52 to the position as shown in FIG. 2. The afterburner igniter control is now rearmed and ready to ignite the afterburner when the pilot calls for afterburning.

It is to be understood that the invention is not limited to the specific description above or other specific figures, but may be used in other ways without departure from its spirit as defined by the following claims.

I claim:

1. A jet engine including a combustion chamber, means for supplying fuel to the combustion chamber to be burned therein, and an afterburner into which gas containing oxygen is delivered, first means for supplying fuel to the afterburner to be burned therein, and means for igniting the mixture of fuel and gas therein, said last-named means including first valved means for controlling a flow of igniting fuel to the afterburner through a second fuel supply means at a location between said combustion chamber and said first means for supplying fuel to the afterburner, means for injecting a predetermined amount of igniting fuel into said combustion chamber, means actuating said first valved means for initiating flow of igniting fuel to the afterburner through said second fuel supply means, second valved means connected to said means for injecting a predetermined amount of igniting fuel to provide for its actuation after said first means for supplying fuel to said afterburner has started to supply fuel.

2. A jet engine including a combustion chamber, means for supplying fuel to the combustion chamber to be burned therein, and an afterburner into which gas containing oxygen is delivered, first means for supplying fuel to the afterburner to be burned therein, and means for igniting the mixture of fuel and gas therein, said last-named means including first valved means for controlling a flow of igniting fuel to the afterburner through a second fuel supply means at a location between said combustion chamber and said first means for supplying fuel to the afterburner, means for injecting a predetermined amount of igniting fuel into said combustion chamber, means actuating said first valved means for initiating flow of igniting fuel to the afterburner through said second fuel supply means, second valved means connected to said means for injecting a predetermined amount of igniting fuel to provide for its actuation after said first means for supplying fuel to said afterburner has started to supply fuel, third valved means interconnecting said first valved means and said means for injecting a predetermined amount of igniting fuel into said combustion chamber to stop the flow through said first valved means when the predetermined amount of igniting fuel has been injected.

3. A jet engine including a combustion chamber, means for supplying fuel to the combustion chamber to be burned therein, and an afterburner into which gas containing oxygen is delivered, first means for supplying fuel to the afterburner to be burned therein, and means for for igniting the mirture of fuel and gas therein, said last-named means including first valved means for controlling a flow of igniting fuel to the afterburner through a second fuel supply means at a location between said combustion chamber and said first means for supplying fuel to the afterburner, means for injecting a predetermined amount of igniting fuel into said combustion chamber, a fluid source, means directing fluid from said fluid source to said first valved means to actuate it for initiating flow of igniting fuel to the afterburner through said second fuel supply means, a second valved means connected to said means for injecting a predetermined amount of igniting fuel to provide for its actuation, means directing fluid from said fluid source, to said second valved means to actuate it after said first means for supplying fuel to said afterburner has started to supply fuel.

4. A jet engine including a combustion chamber, means for supplying fuel to the combustion chamber to be burned therein, and an afterburner into which gas containing oxygen is delivered, first means for supplying fuel to the afterburner to be burned therein, and means for igniting the mixture of fuel and gas therein, said last-named means including first valved means for controlling a flow of igniting fuel to the afterburner through a second fuel supply means at a location between said combustion chamber and said first means for supplying fuel to the afterburner, said first valved means including a fluid operated valve biased to a closed position, a first fluid source, a second fuel source, means for injecting a predetermined amount of igniting fuel into said combustion chamber, means directing fluid from said first fluid source to open said fluid operated valve for initiating flow of fuel from said second fuel source to the afterburner through said second fuel supply means, second valved means connected to said means for injecting a predetermined amount of igniting fuel to provide for its actuation after said first means for supplying fuel to said afterburner has started to supply fuel.

5. A jet engine including a combustion chamber, means for supplying fuel to the combustion chamber to be burned therein, and an afterburner into which gas containing oxygen is delivered, first means for supplying fuel to the afterburner to be burned therein, and means for igniting the mixture of fuel and gas therein, said last-named means including first valved means for controlling a flow of igniting fuel to the afterburner through a second fuel supply means at a location between said combustion chamber and said first means for supplying fuel to the afterburner, means for injecting a predetermined amount of igniting fuel into said combustion chamber, said means for injecting a predetermined amount of igniting fuel into said combustion chamber including a chamber having igniting fuel therein and means for forcing the fuel from said chamber, and second valved means to actuate said means for forcing said fuel from said chamber, means actuating said first valved means for initiating flow of igniting fuel to the afterburner, through said second fuel supply means, third valved means connected to said means for injecting a predetermined amount of igniting fuel to provide for actuation of said second valved means after said first means for supplying fuel to said afterburner has started to supply fuel.

6. A jet engine including a combustion chamber, means for supplying fuel to the combustion chamber to be burned therein, and an afterburner into which gas containing oxygen is delivered, first means for supplying fuel to the afterburner to be burned therein, and means for igniting the mixture of fuel and gas therein, said last-named means including first valved means for controlling a flow of igniting fuel to the afterburner through a second fuel supply means at a location between said combustion chamber and said first means for supplying fuel to the afterburner, means for injecting a predetermined amount of igniting fuel into said combustion chamber, a first fuel source, a second fluid source, said means for injecting a predetermined amount of igniting fuel into said combustion chamber including a chamber having igniting fuel therein and means for forcing the fuel from said chamber, and second valved means to actuate said means for forcing said fuel from said chamber, said second valved means including a biased valve being movable between two positions, in its biased position said chamber is connected to said first fuel source to fill said chamber, in its other position said chamber is connected to said combustion chamber and said means for forcing said fuel from said chamber is connected to said second fluid source for operating it, means actuating said first valved means for initiating flow of igniting fuel to the afterburner through said second fuel supply means, third valved means connected to said means for injecting a predetermined amount of igniting fuel to provide for actuation of said biased valve to its other position after said first means for supplying fuel to said afterburner has started to supply fuel.

7. A jet engine including a combustion chamber, means for supplying fuel to the combustion chamber to be burned therein, and an afterburner into which gas containing oxygen is delivered, first means for supplying fuel to the afterburner to be burned therein, and means for igniting the mixture of fuel and gas therein, said last-named means including first valved means for controlling a flow of igniting fuel to the afterburner through a second fuel supply means at a location between said combustion chamber and said first means for supplying fuel to the afterburner, means for injecting a predetermined amount of igniting fuel into said combustion chamber, said means for injecting a predetermined amount of igniting fuel into said combustion chamber including a chamber having igniting fuel therein and means for forcing the fuel from said chamber, and second valved means to actuate said means for forcing said fuel from said chamber, means actuating said first valved means for initiating flow of igniting fuel to the afterburner through said second fuel supply means, third valved means connected to said means for injecting a predetermined amount of igniting fuel to provide for actuation of said second valved means after said first means for supplying fuel to said afterburner has started to supply fuel, said third valved means being connected to said first means for supplying fuel to the afterburner to be burned.

8. A jet engine including a combustion chamber, means for supplying fuel to the combustion chamber to be burned therein, and an afterburner into which gas containing oxygen is delivered, first means for supplying fuel to the afterburner to be burned therein, said first means including a spray injector, and means for igniting the mixture of fuel and gas therein, said last-named means including first valved means for controlling a flow of igniting fuel to the afterburner through a second fuel supply means at a location between said combustion chamber and said first means for supplying fuel to the afterburner, means for injecting a predetermined amount of igniting fuel into said combustion chamber, said means for injecting a predetermined amount of igniting fuel into said combustion chamber including a chamber having igniting fuel therein and means for forcing the fuel from said chamber, and second valved means to actuate said means for forcing said fuel from said chamber, means actuating said first valved means for initiating flow of igniting fuel to the afterburner through said second fuel supply means, third valved means connected to said means for injecting a predetermined amount of igniting fuel to provide for actuation of said second valved means after said spray injector for injecting fuel in said afterburner has started to inject fuel, said third valved means being connected to said spray injector of said first means for supplying fuel to the afterburner to be burned.

9. A jet engine including a combustion chamber, means for supplying fuel to the combustion chamber to be burned therein, and an afterburner into which gas containing oxygen is delivered, first means for supplying fuel to the afterburner to be burned therein, said first means including fuel injection means, and means for igniting the mixture of fuel and gas therein, said last-named means including first valved means for controlling a flow of igniting fuel to the afterburner through a second fuel supply means at a location between said combustion chamber and said first means for supplying fuel to the afterburner, said first valved means including a fluid operated valve biased to a closed position, a first fluid source, a second fuel source, means for injecting a predetermined amount of igniting fuel into said combustion chamber, means directing fluid from said first fluid source to open said fluid operated valve for initiating flow of fuel from said second fuel source to the afterburner through said second fuel supply means, second valved means connected to said means for injecting a predetermined amount of igniting fuel to provide for its actuation after said fuel injection means has started to inject fuel, means connecting said means for injecting a predetermined amount of igniting fuel into said combustion chamber to said fluid operated valve to move it to a closed position when open.

10. A jet engine including a combustion chamber, means for supplying fuel to the combustion chamber to be burned therein, and an afterburner into which gas containing oxygen is delivered, first means for supplying fuel to the afterburner to be burned therein, and means for igniting the mixture of fuel and gas therein, said last-named means including first valved means for controlling a flow of igniting fuel to the afterburner through a second fuel supply means at a location between said combustion chamber and said first means for supplying fuel to the afterburner, said first valved means including a fluid operated valve comprising a piston movable in a bore and biased to a closed position, and means directing substantially equal pressures to both ends of said piston so that it is maintained in its biased position when first means is not supplying fuel to the afterburner, means for injecting a predetermined amount of igniting fuel into said combustion chamber, means increasing one of said pressures so that said piston is moved to an open position for initiating flow of fuel into the afterburner through said second fuel supply means, second valved means connected to said means for injecting a predetermined amount of igniting fuel to provide for its actuation after said first means for supplying fuel to said afterburner has started to supply fuel.

11. A jet engine including a combustion chamber, means for supplying fuel to the combustion chamber to be burned therein, and an afterburner into which gas containing oxygen is delivered, first means for supplying fuel to the afterburner to be burned therein, and means for igniting the mixture of fuel and gas therein, said last-named means including first valved means for controlling a flow of igniting fuel to the afterburner through a second fuel supply means at a location between said combustion chamber and said first means for supplying fuel to the afterburner, means for injecting a predetermined amount of igniting fuel into said combustion chamber, said means for injecting a predetermined amount of igniting fuel into said combustion chamber including a chamber having igniting fuel therein and means for forcing the fuel from said chamber, and second valved means to actuate said means for forcing said fuel from said chamber, means actuating said first valved means for initiating flow of igniting fuel to the afterburner through said second fuel supply means, third valved means connected to said means for injecting a predetermined amount of igniting fuel to provide for actuation of said second valved means after said first means for supplying fuel to said afterburner has started to supply fuel, fourth valve means interconnecting said first valved means and said means for injecting a predetermined amount of igniting fuel into said combustion chamber to stop the flow through said first valved means when the predetermined amount of igniting fuel has been injected.

12. A jet engine including a combustion chamber, means for supplying fuel to the combustion chamber to be burned therein, and an afterburner into which gas containing oxygen is delivered, first means for supplying fuel to the afterburner to be burned therein, and means for igniting the mixture of fuel and gas therein, said last-named means including first valved means for controlling a flow of igniting fuel to the afterburner through a second fuel supply means at a location between said combustion chamber and said first means for supplying fuel to the afterburner, means for injecting a predetermined amount of igniting fuel into said combustion chamber, said means for injecting a predetermined amount of igniting fuel into said combustion chamber including a chamber having igniting fuel therein and piston means for forcing the fuel from said chamber, and second valved means to actuate said piston means for forcing said fuel from said chamber, means actuating said first valved means for initiating flow of igniting fuel to the afterburner through said second fuel supply means, third valved means connected to said means for injecting a predetermined amount of igniting fuel to provide for actuation of said second valved means after said first means for supplying fuel to said afterburner has started to supply fuel, said piston means having passage means for directing a fluid to said first valved means when the predetermined amount of fuel has been injected to actuate said first valved means for ceasing flow therethrough of igniting fuel to the afterburner.

13. A jet engine including a combustion chamber, means for supplying fuel to the combustion chamber to be burned therein, and an afterburner into which gas containing oxygen is delivered, first means for supplying fuel to the afterburner to burned therein, and means for igniting the mixture of fuel and gas therein, said last-named means including first valved means for controlling a flow of igniting fuel to the afterburner through a second fuel supply means at a location between said combustion chamber and said first means for supplying fuel to the afterburner, means for injecting a predetermined amount of igniting fuel into said combustion chamber, a first fuel source, a second fluid source, said means for injecting a predetermined amount of igniting fuel into said combustion chamber including a chamber having igniting fuel therein and means for forcing the fuel from said chamber, and second valved means to actuate said means for forcing said fuel from said chamber, said second valved means including a biased valve comprising a contoured piston being movable between two positions, in its biased position said chamber is connected to said first fuel source to fill said chamber, in its other position said chamber is connected to said combustion chamber and said means for forcing said fuel from said chamber is connected to said second fluid source for operating it, means directing substantially equal pressures to both ends of said contoured piston, means actuating said first valved means for initiating flow of igniting fuel to the afterburner through said second fuel supply means, means increasing one of the pressures to provide for actuation of said contoured piston to its other position after said first means for supplying fuel to said afterburner has started to supply fuel.

References Cited by the Examiner
UNITED STATES PATENTS 2,804,241    8/1957    McDowall et al. ____ 60—35.6 X
2,949,738    8/1960    Crim et al. _____ 60—39.82

JULIUS E. WEST, *Primary Examiner.*